United States Patent [19]

Dimmick

[11] 4,221,890
[45] Sep. 9, 1980

[54] EPOXY RESIN COMPOSITION AND METHOD FOR MAKING SAME

[75] Inventor: Floyd E. Dimmick, Barrington Hills, Ill.

[73] Assignee: Thermal-Chem, Inc., Elk Grove Village, Ill.

[21] Appl. No.: 838,360

[22] Filed: Sep. 30, 1977

[51] Int. Cl.$^2$ .......................... C08K 5/13; C08K 5/53
[52] U.S. Cl. ..................................... 525/407; 528/93; 528/94; 528/103; 528/104; 528/89
[58] Field of Search .......... 260/2 EC, 18 PN, 47 EC, 260/18 EP; 528/88, 93, 94, 103, 104

[56] References Cited

U.S. PATENT DOCUMENTS

| | | | |
|---|---|---|---|
| 3,085,075 | 4/1963 | Lockshin et al. | 260/18 PN |
| 3,346,533 | 10/1967 | Strother | 260/47 EC X |
| 3,428,601 | 2/1969 | Dijkstra et al. | 528/104 X |
| 3,575,870 | 4/1971 | Shimoyama | 528/104 X |
| 3,703,496 | 11/1972 | Hodan et al. | 260/47 EC |
| 3,738,862 | 6/1973 | Klarquist et al. | 260/47 EC X |
| 3,763,098 | 10/1973 | Green et al. | 260/47 EC X |
| 3,853,812 | 12/1974 | Helm | 260/47 EC |

Primary Examiner—Sandra M. Person
Attorney, Agent, or Firm—Thomas R. Vigil

[57] ABSTRACT

An epoxy resin composition which is useful for repairing concrete surfaces having an epoxy resin combined with a curing agent comprised of polyamines and phenolic accelerators. In one embodiment, the epoxy resin is conditioned with a resin modifier comprised of glycidylethers and phenolic and phosphite accelerators prior to being combined with the curing agent. The method for making the curing agent includes a first stage in which an aliphatic polyamine is combined with Bisphenol A and heated to 125° C. for one hour and allowed to cool to room temperature and a second stage in which a second polyamine and an accelerator is added to the product of the first stage. In one embodiment of the method for preparing the curing agent, phenol is added to the mixture of the first stage when the mixture has cooled to 65° C. In another embodiment, butyl glycidylether is added as the first step in the second stage to the product of the first stage prior to the addition of the second polyamine and the accelerator.

40 Claims, No Drawings

EPOXY RESIN COMPOSITION AND METHOD FOR MAKING SAME

BACKGROUND OF THE INVENTION

1. Field of the Invention

The present invention relates to a series of epoxy resin adhesive compounds which readily adhere to moist, wet, and dry surfaces and cure at temperatures ranging from 0° F. (−18° C.) to 140° F. (60° C.).

2. Description of the Prior Art

Epoxy resin adhesives for repairing concrete surfaces have been commercially available for some time. These adhesives, when applied in dry weather and temperatures above 40° F. (4° C.), generally have satisfactory durability and stability characteristics. However, when applied in less than ideal weather conditions, particularly in temperatures below freezing and/or under moist or wet conditions, these epoxy systems either failed to cure properly or were short lived.

With the trend in the construction industry towards all weather and year round working schedules, there has arisen a demand for commercially available adhesives for repairing concrete surfaces under wet and cold weather conditions.

SUMMARY OF THE INVENTION

According to the invention there is provided a low viscosity, 100% solids epoxyamine composition which is workable and cures at a temperature at least as low as 0° F. and at least as high as 140° F., which is particularly adapted for concrete rehabilitation and preservation and which comprises an epoxy resin having a plurality of 1,2 epoxy groups and a curing agent including a first aliphatic polyamine composition, a first accelerator comprising Bisphenol-A, a second polyamine composition, and a second accelerator selected from the group comprising N-aminoethylpiperazine, nonyl phenol, and tris (dimethylaminomethyl) phenol.

Further according to the invention there is provided a low viscosity, 100% solids epoxyamine composition which is workable and cures at a temperature at least as low as 0° F. and at least as high as 140° F., which is particularly adapted for concrete rehabilitation and preservation, and which comprises from 70-90% by weight epoxy resin component having a plurality of 1,2 epoxy groups and from 10-30 percent by weight curing agent including a first aliphatic polyamine composition, a first accelerator comprising Bisphenol-A, a second polyamine composition and a second accelerator selected from the group comprising N-aminoethylpiperazine, nonyl phenol and tris (dimethylaminoethyl) phenol.

Further according to the invention there is provided a method for forming an epoxy resin component for an epoxy resin and curing agent composition which is useful in the preservation and rehabilitation of concrete and which is workable at a temperature at least as low as 0° F., said method comprising the steps of: placing an epoxy resin in a container, agitating the contents of the container, adding a resin modifier by gradually pouring the resin modifier into the container, and continuing to agitate the mixture until the ingredients are thoroughly mixed.

Further according to the invention there is provided a method for forming a resin modifier for addition to the epoxy resin component described above and comprising the steps of: placing a glycidylether in a container, stirring the contents of the container, heating the contents of the container, slowly charging Bisphenol-A to the stirred contents of the container as the temperature increases to approximately 80° C., agitating the contents of the container until all the solids are dissolved and fully blended while maintaining the temperature at approximately 80° C., allowing the contents of the container to cool at room temperature while continuing to moderately agitate the container, adding triphenyl phosphite to the solution after it has cooled to room temperature and continuing to agitate the contents of the container until the triphenyl phosphite has fully blended with the other ingredients.

Further according to the invention there is provided a method for forming a curing agent for polymerizing epoxy resin which is useful in the preservation and rehabilitation of concrete and which is workable and cures at a temperature at least as low as 0° F., said method comprising the steps of: placing at least one aliphatic polyamine in a first container; adding an accelerator comprising Bisphenol-A to the first container; sealing the container, agitating the contents of the first container; heating the contents of the first container to approximately 125° C. and maintaining the contents of the first container at that temperature for approximately one hour while continuing to agitate the contents of the first container; cooling the contents of the first container to room temperature; adding a portion of the contents of the first container to a second container; adding at least one second polyamine to the second container; adding at least one second accelerator selected from the group comprising N-aminoethylpiperazine, nonyl phenol and tris (dimethylaminomethyl) phenol; and continuing to agitate the contents of the second container until the mixture is fully blended.

A low viscosity, 100% solids epoxy resin composition which is particularly adapted for concrete rehabilitation and preservation, which is workable and cures at a temperature at least as low as 0° F., and which comprises an A component and a B component which are combined in the field, the A component being 100% epoxy resin sold under the trademark EPON 815 by Shell Chemical Company which is combined with the B component comprising a curing agent in a ratio of 80 percent by weight of the A component with 20 percent by weight of the B component and the curing agent being formed in two stages where, in the first stage, a subcomponent is formed by combining 27.0 percent by weight triethylenetetramine, 40.6 percent by weight diethylenetriamine, 27.0 percent by weight Bisphenol-A and 5.4 percent by weight phenol, and in the second stage, 59.7 percent by weight of the subcomponent defined above is combined with 5.4 percent by weight butyl glycidylether, 13.4 percent by weight N-aminoethylpiperazine, and 21.5 percent by weight amido amine resin sold under the trademark Genamid 250 by General Mills, Inc.

Further according to the invention there is provided a low viscosity, 100% solids epoxy resin composition which is particularly adapted for the rehabilitation and preservation of concrete, which is workable and cures at a temperature at least as low as 0° F., which has a relatively long "pot life" under warm weather conditions and which comprises an A component and a B component which are combined in the field, the A component being 100% epoxy resin sold under the trademark EPON 815 by Shell Chemical Company which is combined with the B component comprising a curing agent in a ratio of 75 percent by weight of the A component with 25 percent by weight of the B component and then the B component is formed in two stages where, in the first stage, a subcomponent is formed by combining 84.2 percent by weight of triethylenetetramine with 15.8 percent by weight of Bisphenol-A and in the second stage, 31.6 percent by weight of this subcomponent is combined with 6.6 percent by weight of N-aminoethylpiperazine, 6.6 percent by weight of butyl glycidylether and 55.2 percent by weight of polyamide resin sold under the trademark Azamid-360 by AZ Products Company.

Still further according to the invention there is provided a low viscosity, 100% solids epoxy resin composition which is particularly useful in welding cracks in concrete, which is workable and cures at temperatures at least as low as 0° F. and which comprises an A component and a B component which are combined in the field, the A component comprising a resin and a resin modifier wherein the resin modifier comprises 62.5 percent by weight of butyl glycidylether, 20.8 percent by weight of Bisphenol-A and 16.7 percent by weight of triphenylphosphate and 5.6 percent by weight of this modifier is combined with 94.4 percent by weight of an epoxy resin sold under the trademark EPON 815 by Shell Chemical Company to form the A component, the B component being a curing agent which is formed in two stages and where, in the first stage, a subcomponent is formed by combining 27.0 percent by weight of triethylenetetramine with 40.6 percent by weight of diethylenetriamine, 27.0 percent by weight of Bisphenol-A and 5.4 percent by weight of phenol, and in the second stage, 30.4 percent by weight of this subcomponent is added to 25.5 percent by weight of triethylenetetramine, 20.6 percent by weight of N-aminoethylpiperazine and 15.7 percent by weight of amido amine sold under the trademark Genamid 250 by General Mills, Inc., 5.1 percent by weight of nonyl phenol and 2.7 percent by weight of tris (dimethylaminomethyl) phenol sold under the trademark DMP-30 by Rohm and Hass Company, the A and B components being combined in the field in a ratio of 80 percent by weight of the A component with 20 percent by weight of the B component.

DESCRIPTION OF THE PREFERRED EMBODIMENT

In the repair of concrete surfaces it is common to use a composition of an epoxy resin and a curing agent to form a material suitable for welding cracked concrete, hollow plained concrete or concrete to steel as a monolithic unit. In addition, this composition may be used as a binder to hold particles of sand and/or stone together as an epoxy mortar and apply it as a patch to spalled concrete, filler for chuckholes or as an overlay for concrete floors, bridge decks and other concrete surfaces used by vehicular or pedestrian traffic. The uses of such compositions of epoxy resin and curing agent is a well known technique and does not comprise any portion of the invention. According to the teachings of the present invention, there are a particular series of compositions and the steps involved in forming these compositions which give the compositions certain physical and chemical properties that enable the compositions to be applied and cured in both cold weather and to wet surfaces. It is recognized by those well versed in the field of repairing concrete that conventional epoxy systems cannot be successfully applied nor cured in adverse weather conditions and it is believed this invention significantly relieves the weather constraints that have restricted the use of concrete surface repair compositions.

The compositions of this invention are the product of the mixing of two substances, an epoxy resin having a plurality of 1,2 epoxy groups and a curing agent comprised of linear and branched aliphatic polyamines, alicyclic polyamines, amido-polyamines combined with accelerators which increase polymerization during the curing process.

The epoxy resins are commercially available and constitute no part of this invention. Typical epoxy resins used in making adhesives and coatings are bisphenol-epichlorohydrin resins having an epoxy equivalent ranging from 150 to 550. Some epoxy resins are commercially available in a modified form in which a diluent has been added to dissolve the resin and keep the product in a liquid state at room temperatures. Specific epoxy resins which have been successfully tested by the inventor include an epoxy resin sold under the trademark EPON 1001 by Shell Chemical Company, a bisphenol-epichlorohydrin resin having an epoxy equivalent of 450 to 550; an epoxy resin sold under the trademark EPON 834 by Shell Chemical Company, a modified bisphenol-epichlorohydrin resin having an epoxy equivalent of 230 to 280; an epoxy resin sold under the trademark EPON 828 by Shell Chemical Company, a modified bisphenol-epichlorohydrin resin having an epoxy equivalent of 185 to 192; and an epoxy resin sold under the trademark EPON 815 by Shell Chemical Company, a modified bisphenol-epichlorohydrin resin having an epoxy equivalent of 175 to 192.

In a further modification of this invention, to modify the resin so that it will better react with the curing agent, additional diluents and accelerators are added to the resin. In addition, these resin modifiers change the viscosity of the resin composition, such that it can be more uniformly applied to the hole or crack in the surface of the concrete. The diluents which have been successfully tested include butyl glycidylether, 2 ethyl hexyl glycidylether and cresyl glycidylether. The accelerators which have been used include a combination of Bisphenol A and triphenyl phosphite which can be further modified by the addition of phenol to improve the curing properties of the resin in certain conditions.

A significant feature of the present invention is the curing agent which is used to polymerize the epoxy resins. While the basic ingredients are commercially available, and have been used in curing agents, the present invention teaches that certain combinations of these ingredients have resulted in forming an epoxy-amine composition that can be applied and cured in cold and wet conditions. The curing agent of the present invention comprises an aliphatic polyamine, a first accelerators, a second polyamine and a second accelerators. The aliphatic polyamines successfully tested include diethylenetriamine (DETA), triethylenetetramine (TETA), ethylenediamine (EDA), pentaethylenehexamine (PEHA), tetraethylenepentamine (TEPA), and mixtures thereof. However, it would be apparent to those skilled in the art that other like polyamines can be used. The first accelerators which has been successfully tested is Bisphenol A which, in some compositions can be further modified by the addition of phenol. To this mixture a second polyamine selected from the groups of aliphatic polyamines, alicyclic polyamines and amidopolyamines and mixtures thereof is added. Successfully demonstrated members of these groups are the same five aliphatic polyamines (DETA, TETA, EDA, PEHA, and TEPA); alicyclic polyamines N-aminoethylpiperazine (N-AEP) which also will act as an accelerator and menthane diamine; and amidopolyamines sold under the trademark Azamide 325 and Azamide 360 (reactive polyamide resins by AZ Products Company) and Genamid 250 (a reactive amidoamine resin by General Mills, Inc.). To control the rate and temperature of the curing process, a second accelerators is added. Demonstrated second accelerators include the alicyclic polyamine N-AEP, nonyl phenol, and tris (dimenthylaminomethyl) phenol and mixtures thereof.

A method for making the composition is to select one of the epoxy resins and charge it to an open top agitated container. If a resin modifier is desired, it should be prepared by charging from 30 to 80 parts (the preferred amount being 62.5 parts) glycidylether into a heated and agitated container. To this from 1 to 50 parts Bisphenol A (the preferred amount is 20.80 parts) is slowly added with the temperature maintained at approximately 80° C. When all of the solid Bisphenol A is dissolved the tank should continue to be stirred for 15 minutes at a temperature of about 80° C. and then allowed to cool to room temperature while still being stirred. When the solution reaches room temperature, from 1 to 40 parts triphenyl phosphite (the preferred amount is 16.7 parts) is added and the tank is stirred for 10 more minutes. If increased curing ability is desired, from ½ to 20 parts (the preferred amount is 7 parts) phenol may be added prior to the triphenyl phosphite during the cooling period when the temperature of the solution if about 40° C. If phenol is added, the preferred amounts of the other ingredients are adjusted to 60 parts glycidylether, 21 parts Bisphenol A, and 12 parts triphenyl phosphite. When the resin modifier is used, it should be added to the resin slowly and the solution mixed for five minutes. The typical ratios of resin to resin modifier are from 70 to 99 parts resin to 1 to 30 parts resin modifier. The curing agent is formulated in two stages with the first stage made by charging to an agitated heated container from 1 to 99 parts aliphatic polyamines (the preferred amount is approximately 84 parts) and while strongly agitating the polyamines, slowly adding from 1 to 35 parts Bisphenol A (the preferred amount if 16 parts). The container is sealed and heated to 125° C. for one hour. An alternative formulation to the above first stage of making the curing agent would be to combine two aliphatic polyamines (the preferred formula is 27 parts TETA to 40.6 parts DETA) with two accelerators (the preferred formula is 27 parts Bisphenol A and 5.4 parts phenol) with the phenol being added last when the solution has cooled to about 65° C. The solution is allowed to cool to room temperature.

To the above first stage of formulating the curing agent is added a second polyamine and a second accelerator at room temperature while the container is agitated. From 1 to 99 parts of the first stage product is mixed with from 1 to 99 parts second polyamine and from 1 to 25 parts accelerators. A preferred formula is approximately 30 parts first stage product; 62 parts second polyamine of which 25 parts is TETA, 21 parts is N-AEP and 16 parts is Genamid 250 TM; and 8 parts accelerators of which about 5 parts is nonyl phenol and 3 parts is tris (dimethylaminomethyl) phenol sold under the trademark DMP-30 by Rohm and Haas Company. This formula provides the preferred curing agent for situations which require injecting the epoxy-amine adhesive into narrow spaces. For other bonding applications where a mortar-like substance is desired, a diluent is added to the product of the first stage prior to the addition of the second polyamine and second accelerators. Here the formula is from 1 to 99 parts product of first stage, from ½ to 15 parts butyl glycidylether as the diluent, allowed to exotherm, after which the solution is allowed to cool back to room temperature, followed by the addition of from ½ to 25 parts N-AEP which acts as both the second polyamine and second accelerator and from ½ to 99 parts Genamid 250 TM as a second polyamine. The preferred formula is approximately 60 parts product of the first stage, 5.4 parts butyl glycidylether, 13.4 parts N-AEP and 21.5 parts Genamid 250 TM.

An alternative to this latter formula which may be used if more pot life is desired for the composition, is to add approximately 31 parts product of the first stage; 7 parts butyl glycidylether, 7 parts N-AEP and 55 parts Azamide 360 TM.

The final step in the composition is to add the curing agent to the resin (after the resin modifier—if any—has been added) and mix the curing agent with the resin in an open-top container.

The various epoxy resin compositions described above are utilized in the field for various types of adhesive bonding, patching and grouting. Depending on the particular use, different epoxy resin compositions, with or without a resin modifier, are combined with a curing agent in the field for a specific type of adhesive bonding. For example, for mortar overlayment and for patching chuckholes in roads as well as for grouting around steel reinforcement rods or anchor bolts in concrete, the following composition is preferred. This composition comprises an A component which is the resin and a B component which is the curing agent. The A component is one hundred percent (100%) of EPON 815 TM. Eighty percent (80%) of this is mixed with 20% of the curing agent which is formed in two steps in the manner described above. In the first step, a sub-component is prepared in the manner described above having the following composition:

| | |
|---|---|
| TETA | 27.0% |
| DETA | 40.6% |
| BPA | 27.0% |
| Phenol | 5.4% |
| | 100% |

In the second step, the sub-component prepared in the first step is added in the following proportion to three other ingredients as follows:

| | |
|---|---|
| Sub-component from first step | 59.7% |
| BGE | 5.4% |
| N-AEP | 13.4% |
| Genamid 250 TM | 21.5% |
| | 100% |

In the field, the two components are blended in the proportion of 80% resin and 20% by weight of curing agent thoroughly mixed and then utilized for mortar overlayment, chuckhole patches and grouting. Typically, silica sand and/or rock aggregate are also added to the composition.

When an adhesive mortar is being applied under warm weather conditions, it is often desirable to have a longer working time before the gel stage develops. This is commonly referred to as "longer pot life." Where "longer pot life" is desired, the following composition is preferred. This composition again comprises an A component and a B component. The A component is the resin and is formulated from 100% of EPON 815. The curing agent is again formed in two steps. In the first step a subcomponent is prepared in the manner described above and comprises:

|  |  |
|---|---|
| TETA | 84.2% |
| BPA | 15.8% |
|  | 100% |

In the second step, the subcomponent prepared in the first step is added in a predetermined percentage to other ingredients as follows:

|  |  |
|---|---|
| subcomponent from first step | 31.6% |
| N-AEP | 6.6% |
| BGE | 6.6% |
| Azanid 360 TM | 55.2% |
|  | 100.0% |

Then components A and B are blended in the following proportions: 75% of component A by weight with 25% of component B by weight. Also, various percentages of silica sand and/or rock aggregate are added to the blended composition.

When it is desired to "weld" cracks in concrete and hollow plane areas, another composition is utilized comprising an A component and a B component where the A component is resin and the B component is a curing agent. In this preferred composition, A component includes resin and a resin modifier. The resin modifier is made up of the following ingredients:

|  |  |
|---|---|
| BGE | 62.5% |
| BPA | 20.8% |
| TPP | 16.7% |
|  | 100.0% |

Then this resin modifier is added in the following proportion to a resin which is EPON 815 TM:

|  |  |
|---|---|
| EPON 815 TM | 94.4% |
| Resin Modifier | 5.6% |
|  | 100.0% |

The B component or curing agent is also formed in two steps in the manner described above. The subcomponent formulated in the first step has the following ingredients:

|  |  |
|---|---|
| TETA | 27.0% |
| DETA | 40.6% |
| BPA | 27.0% |
| Phenol | 5.4% |
|  | 100.0% |

In the second step, the subcomponent prepared in the first step is added to other ingredients in the following percentages by weight:

|  |  |
|---|---|
| subcomponent from first step | 30.4% |
| TETA | 25.5% |
| N-AEP | 20.6% |
| Genamid 250 TM | 15.7% |
| Nonyl Phenol | 5.1% |
| DMP-30 TM | 2.7% |
|  | 100.0% |

Then in the field, the components are blended and mixed together in the following proportions:

|  |  |
|---|---|
| Component A | 80% by weight |
| Component B | 20% by weight |

This composition is used as a neat material without the addition of sand or rock aggregate.

It will be obvious to those skilled in the art that other variations of the above formulas and quantities can be made to the method steps and compositions of the present invention without departing from the teachings of the present invention with satisfactory epoxy resin adhesive compositions being obtained. Accordingly, the scope of the invention is only to be limited as necessitated by the following claims.

I claim:

1. A low viscosity, 100% solids epoxy-amine composition which is workable and cures at a temperature at least as low as 0° F. and at least as high as 140° F., which is particularly adapted for concrete rehabilitation and preservation and which comprises an epoxy resin having a plurality of 1,2 epoxy groups and a curing agent including a first aliphatic polyamine composition, a first accelerator comprising Bisphenol-A, a second polyamine composition, and a second accelerator selected from the group comprising N-aminoethylpiperazine, nonyl phenol, and tris(dimethylaminomethyl)phenol.

2. A composition as described in claim 1 wherein the epoxy resin is a bisphenol-A epichlorohydrin resin having an epoxy equivalent ranging from 150 to 550.

3. A composition as described in claim 2 wherein the bisphenol-A epichlorohydrin resin is selected from the group consisting of resins having the epoxy equivalent of 450–550, 230–280, 185–192 and 175–195.

4. A composition as described in claim 1 wherein the first aliphatic polyamine composition is selected from the group consisting of diethylenetriamine, triethylenetetramine, ethylenediamine, pentaethylenehexamine and tetraethylenepentamine.

5. A composition as described in claim 1 wherein the first accelerator further comprises phenol.

6. A composition as described in claim 1 wherein the second polyamine composition is selected from the group comprising aliphatic polyamine, alicylic polyamines and amido polyamines.

7. A composition as described in claim 6 wherein the aliphatic polyamine is selected from the group consisting of diethylenetriamine, triethylenetetramine, ethylenediamine, pentaethylenehexamine, and tetraethylenepentamine.

8. A composition as described in claim 6 wherein the alicyclic polyamine is selected from the group consisting of N-aminoethylpiperazine and methane diamine.

9. A composition as described in claim 6 wherein the amido polyamine is selected from the group consisting of reactive polyamide resins and a reactive amido amine resin.

10. A composition as described in claim 1 wherein the curing agent further comprises a diluent.

11. A composition as described in claim 10 wherein the diluent is butyl glycidylether.

12. A composition as described in claim 1 further comprising a resin modifier having a diluent and an accelerator.

13. A composition as described in claim 12 wherein the diluent is selected from the group consisting of butyl glycidylether, 2 ethyl hexyl glycidylether, and cresyl gylcidylether.

14. A composition as described in claim 12 wherein the resin accelerator is selected from the group consisting of Bisphenol A, Triphenyl phosphite, and phenol.

15. A low viscosity, 100% solids epoxyamine composition which is workable and cures at a temperature at least as low as 0° F. and at least as high as 140° F., which is particularly adapted for concrete rehabilitation and preservation, and which comprises from 70-90% by weight epoxy resin component having a plurality of 1,2 epoxy groups and from 10-30 percent by weight curing agent including a first aliphatic polyamine composition, a first accelerator comprising Bisphenol-A, a second polyamine composition and a second accelerator selected from the group comprising N-aminoethylpiperazine, nonyl phenol and tris(dimethylaminoethyl)phenol.

16. A composition as described in claim 15 wherein the curing agent is formed in two steps, the first step being a mixture of the aliphatic polyamine composition and the first accelerator and the second step being a mixture of the product of the first step, a second polyamine composition and a second accelerator.

17. A composition as described in claim 16 wherein the mixture of the first step comprises from 65 to 99 percent by weight aliphatic polyamine composition and from 1 to 35 percent by weight accelerator.

18. A composition as described in claim 17 wherein the first accelerator comprises from 1 to 35 percent by weight Bisphenol A and from 0 to 12 percent by weight phenol.

19. A composition as described in claim 18 wherein the first accelerator further comprises 27 percent by weight Bisphenol A and 5.4 percent by weight phenol and the aliphatic polyamine composition further comprises 40.6 percent by weight diethylenetriamine and 27 percent by weight of an aliphatic polyamine selected from the group consisting of triethylenetetramine, ethylenediamine, and pentaethylenehexamine.

20. A composition as described in claim 18 wherein the first accelerator further comprises approximately 16 percent by weight Bisphenol A and the aliphatic polyamine composition further comprises 84 percent by weight selected from a group consisting of diethylenetriamine, triethylenetetramine, and tetraethylenepentamine.

21. A composition as described in claim 18 wherein the first accelerator further comprises 20 percent by weight Bisphenol A and the aliphatic polyamine composition further comprises 80 percent by weight ethylenediamine.

22. A composition as described in claim 18 wherein the first accelerator further comprises 25 percent by weight Bisphenol A and the aliphatic polyamine further comprises 75 percent by weight pentaethylenehexamine.

23. A composition as described in claim 16 wherein the second step comprises from 1 to 99 percent by weight the product of the first step and from ½ to 99 percent by weight second polyamine composition and from ½ to 25 percent by weight second accelerator.

24. A composition as described in claim 23 wherein the product of the first step is approximately 30 percent by weight; the second polyamine composition comprises approximately 25 percent by weight triethylenetetramine, approximately 21 percent by weight N-aminoethylpiperazine, approximately 16 percent by weight amido amine resin; and a second accelerator comprises approximately 5 percent by weight nonyl phenol and 3 percent by weight tris(dimethylaminomethyl)phenol.

25. A composition as described in claim 16 wherein the second step further comprises a diluent butyl glycidylether.

26. A composition as described in claim 24 wherein the product of the first step is approximately 60 percent by weight, the diluent butyl glycidylether is approximately 5 percent by weight, the second polyamine composition is approximately 20 percent by weight amido amine resin, and a second accelerator is approximately 50 percent by weight N-aminoethylpiperazine.

27. A composition as described in claim 25 wherein the product of the first step is approximately 32 percent by weight, the diluent butyl glycidylether is approximately 7 percent by weight, the second polyamine composition is approximately 55 percent by weight polyamine resin and the second accelerator is approximately 6 percent by weight N-aminoethylpiperazine.

28. A composition as described in claim 15 wherein said epoxy resin component includes a resin modifier constituting from 1 to 30 percent by weight of the epoxy resin component.

29. A composition as described in claim 28 wherein the resin modifier is comprised of 25 to 80 percent by weight of a diluent selected from a group consisting of butyl glycidylether, 2 ethyl hexyl glycidylether, and cresyl glycidylether and 20 to 75 percent by weight of an accelerator comprising from 1 to 50 percent by weight Bisphenol A and from 1 to 40 percent by weight Triphenyl phosphite.

30. A composition as described in claim 29 wherein the diluent is 62.5 percent by weight, the Bisphenol A is 20.8 percent by weight, and the triphenyl phosphite is 16.7 percent by weight.

31. A composition as described in claim 29 wherein the resin accellerator further comprises from 0.5 to 20 percent by weight phenol.

32. A composition as described in claim 31, wherein the diluent is 60 percent by weight, the Bisphenol A is 21 percent by weight, the triphenyl phosphite is 12 percent by weight and the phenol is 7 percent by weight.

33. A method for forming an epoxy resin modifier and an epoxy resin component containing said epoxy resin modifier for an epoxy resin and curing agent composition which is useful in the preservation and rehabilitation of concrete and which is workable and cures at a temperature at least as low as 0° F., said method comprising the steps of: placing a glycidylether in a container, stirring the contents of the container, heating the contents of the container, slowly charging Bishpenol A to the stirred contents of the container as the temperature increases to approximately 80° C., agitating the contents of the container until all the solids are dissolved and fully blended while maintaining the temperature at approximately 80° C., allowing the contents of the container to cool to room temperature while continuing to moderately agitate the container, adding triphenyl phosphite to the solution after it has cooled to room temperature until the triphenyl phosphite has fully blended with the other ingredients to form the resin modifier and then placing an epoxy resin in a container, agitating the contents of the container, adding the resin modifier by gradually pouring the resin modifier into the container, and continuing to agitate the mixture until the ingredients are thoroughly mixed to form the epoxy resin component.

34. A method for forming a curing agent for polymerizing epoxy resin which is useful in the preservation and rehabilitation of concrete and which is workable and cures at a temperature at least as low as 0° F., said method comprising the steps of: placing at least one aliphatic polyamine in a first container; adding an accelerator comprising Bisphenol-A to the first container; sealing the container; agitating the contents of the first container; heating the contents of the first container to approximately 125° C. and maintaining the contents of the first container at that temperature for approximately one hour while continuing to agitate the contents of the first container; cooling the contents of the first container to room temperature; adding a portion of the contents of the first container to a second container; adding at least one second polyamine to the second container; adding at least one second accelerator selected from the group comprising N-aminoethylpiperazine, nonyl phenol and tris(dimethylaminomethyl)phenol; and continuing to agitate the contents of the second container until the mixture is fully blended.

35. The method according to claim 34 wherein two aliphatic polyamines are placed in the first container, one polyamine being triethylenetetramine and the other one being diethylenetriamine.

36. The method according to claim 35 further comprising the steps of: prior to cooling the contents of the first container to room temperature, cooling the contents thereof to approximately 65° C.; adding to the first container, as another accelerator, phenol; and then continuing to agitate the contents until the mixture is fully blended and cooled to room temperature.

37. The method according to claim 34 further comprising the steps of: after placing a predetermined quantity of the contents of the first container in the second container, adding butyl glycidylether to the mixture in the second container, allowing this mixture to exotherm while agitating the mixture, followed by cooling the mixture to room temperature and then adding the second polyamine and the second accelerator to the mixture in the second container.

38. A low viscosity, 100% solids epoxy resin composition which is particularly adapted for concrete rehabilitation and preservation, which is workable and cures at a temperature at least as low as 0° F., and which comprises an A component and a B component which are combined in the field, the A component being 100% epoxy resin which is combined with the B component comprising a curing agent in a ratio of 80 percent by weight of the A component with 20 percent by weight of the B component and the curing agent being formed in two stages where, in the first stage, a subcomponent is formed by combining 27.0 percent by weight triethylenetetramine, 40.6 percent by weight diethylenetriamine, 27.0 percent by weight Bisphenol-A and 5.4 percent by weight phenol, and in the second stage, 59.7 percent by weight of the subcomponent defined above is combined with 5.4 percent by weight butyl glycidylether, 13.4 percent by weight N-aminoethylpiperazine and 21.5 percent by weight amido amine resin.

39. A low viscosity, 100% solids epoxy resin composition which is particularly adapted for the rehabilitation and preservation of concrete, which is workable and cures at a temperature at least as low as 0° F., which has a relatively long "pot life" under warm weather conditions and which comprises an A component and a B component which are combined in the field, the A component being 100% epoxy resin which is combined with the B component comprising a curing agent in a ratio of 75 percent by weight of the A component with 25 percent by weight of the B component and then the B component is formed in two stages where, in the first stage, a subcomponent is formed by combining 84.2 percent by weight of triethylenetetramine with 15.8 percent by weight of Bisphenol-A and in the second stage, 31.6 percent by weight of this subcomponent is combined with 6.6 percent by weight of N-aminoethylpiperazine, 6.6 percent by weight of butyl glycidylether and 55.2 percent by weight of polyamide resin.

40. A low viscosity, 100% solids epoxy resin composition which is particularly useful in welding cracks in concrete, which is workable and cures at temperatures at least as low as 0° F. and which comprises an A component and a B component which are combined in the field, the A component comprising a resin and a resin modifier wherein the resin modifier comprises 62.5 percent by weight of butyl glycidylether, 20.8 percent by weight of Bisphenol-A and 16.7 percent by weight of triphenylphoshate and 5.6 percent of this modifier is combined with 94.4 percent by weight of an epoxy resin to form the A component, the B component being a curing agent which is formed in two stages and where, in the first stage, a subcomponent is formed by combining 27.0 percent by weight of triethylenetetramine with 40.6 percent by weight of diethylenetriamine, 27.0 percent by weight of Bisphenol-A, and 5.4 percent by weight of phenol, and in the second stage, 30.4 percent by weight of this subcomponent is added to 25.5 percent by weight of triethylenetetramine, 20.6 percent by weight of N-aminoethylpiperazine and 15.7 percent by weight of amido amine, 5.1 percent by weight of nonyl phenol and 2.7 percent by weight of tris(dimethylaminomethyl)phenol, the A and B components being combined in the field in a ratio of 80 percent by weight of the A component with 20 percent by weight of the B component.

* * * * *